United States Patent [19]

Marin et al.

[11] Patent Number: 4,827,373

[45] Date of Patent: May 2, 1989

[54] HIGH-VOLTAGE COMPRESSED-GAS CIRCUIT BREAKER

[75] Inventors: Heiner Marin; Dieter Noack, both of Berlin, Fed. Rep. of Germany

[73] Assignee: Siemens Aktiengesellschaft, Berlin and Munich, Fed. Rep. of Germany

[21] Appl. No.: 170,765

[22] Filed: Mar. 21, 1988

[30] Foreign Application Priority Data

Apr. 1, 1987 [DE] Fed. Rep. of Germany ... 8704829[U]

[51] Int. Cl.[4] .......................... H02B 5/00; H02B 7/00

[52] U.S. Cl. .................................................... 361/335

[58] Field of Search ........................ 361/335, 334, 426; 174/31 R, 12 BH, 19; 200/144 R, 148 R, 149 B

[56] References Cited

U.S. PATENT DOCUMENTS 2,303,119 11/1942 Froland .
2,376,725 5/1945 Richardson ........................... 174/19
2,533,545 12/1950 Ainsworth et al. .
2,878,304 3/1959 Mezzack ........................ 174/12 BH
2,903,501 9/1959 O'Mara ................................ 174/19
3,352,988 11/1967 Wachta et al. .
3,983,460 9/1976 Kuhn et al. ......................... 361/334

FOREIGN PATENT DOCUMENTS 270123 8/1950 Switzerland .

OTHER PUBLICATIONS

Siemens Publication, "$SF_6$ circuit-breakers 3AS1".

*Primary Examiner*—Roy N. Envall, Jr.

[57] ABSTRACT

A high-voltage compressed-gas circuit breaker has contact plates with a contact face for the incoming cables. The position of these contact faces and the attachment bores on the contact faces for the connection of cables will vary depending on the form of installation given in the switching equipment. The circuit breaker has contact faces which are formed as contact parts which are separate from the terminal plates. On both contact parts, bores are provided for connecting the contact part and the terminal plate to each other, these bores protruding beyond the outside diameter of the interrupter unit on which the terminal plate is applied. The bores make possible a reversal of the contact face by 180°.

5 Claims, 1 Drawing Sheet

HIGH-VOLTAGE COMPRESSED-GAS CIRCUIT BREAKER

This application is related to commonly owned, co-pending application Ser. No. 170,764, filed on even date, for a "High-Voltage Compressed-Gas Circuit Breaker".

FIELD OF THE INVENTION

The present invention relates to a high-voltage circuit breaker in particular a compressed-gas circuit breaker.

DESCRIPTION OF RELATED ART

In prior compressed-gas circuit breakers, the interrupter units are closed off at the outer end faces by terminal plates which comprise a contact face for cables that are attached there. Such a high-voltage circuit breaker, namely compressed-gas circuit breaker filled with $SF_6$, is known from the Siemens publication "$SF_6$-Circuit breakers 3 AS1" (Catalog number E 122/1564-220). In that known circuit breaker, the contact faces are formed by shoulders on the terminal plates. This requires a plurality of differently designed terminal plates, since the alignment of the contact faces may change depending on the switching equipment in which the circuit breaker is to be installed. Similarly, the arrangement and dimensions of the attachment means on the contact faces by which the electric cables leading to the breaker are attached to the terminal plates, in particular overhead cables may also change depending on the switching equipment. Because the terminal plates form a part that closes off the interior of the interrupter units, each individual switch must be manufactured exactly in accordance with its intended use.

It is an object of the present invention to simplify the layout of the high-voltage circuit breaker by a different design of the terminal plates.

SUMMARY OF THE INVENTION

The above and other objectives are achieved in a high-voltage compressed-gas circuit breaker by providing at least one interrupter unit with end faces, terminal plates closing off the interrupter unit at the end faces, and a contact part which is separable from the terminal plate and includes a contact face for receiving cable. Bores in the contact part and in the terminal plate receive means for connecting the plate with the contact part. The bores in the terminal plate lie in a peripheral region which protrudes beyond an outside diameter of the interrupter unit. The bores are respectively distributed in the contact part and the terminal plate such that the contact part is reversibly attachable at the terminal plate.

It is the contact face for the incoming and outgoing cables which must be varied with respect to the different modes of installation of the circuit breaker in switching equipment. The present invention thus provides a contact face which is separate from the terminal plate. This terminal plate is at the same time part of the interrupter unit and closes its interior. The terminal plate is a structural part which is uniquely correlated with the interrupter unit, so that the manufacture of the interrupter unit, the circuit breaker and its filling with gas, can be fully completed without having to decide which variant of the contact face must be applied on the terminal plate.

The interchangeability of the contact faces is possible because the bores in the terminal plate for receiving the part with the contact face lie in a peripheral region which protrudes over the outside diameter of the interrupter unit, so that these peripheral regions do not impair the closure of the interior of the interrupter unit. The bores and the attachment means are also easily accessible from the outside. In addition, the distribution or arrangement of these bores is such that the contact face is reversible. This makes it possible to handle practically all installation variants.

It is especially advantageous if the structural part with the contact face is reversible by 180°. In such embodiments, the peripheral region with the bores lies only on opposite sides of the terminal plate, so that the region perpendicular to the peripheral region is not enlarged relative to the outside diameter of the interrupter unit. It is this region that is perpendicular to the peripheral region which determines the disruptive distance between adjacent switch poles.

DETAILED DESCRIPTION

Figure 1:
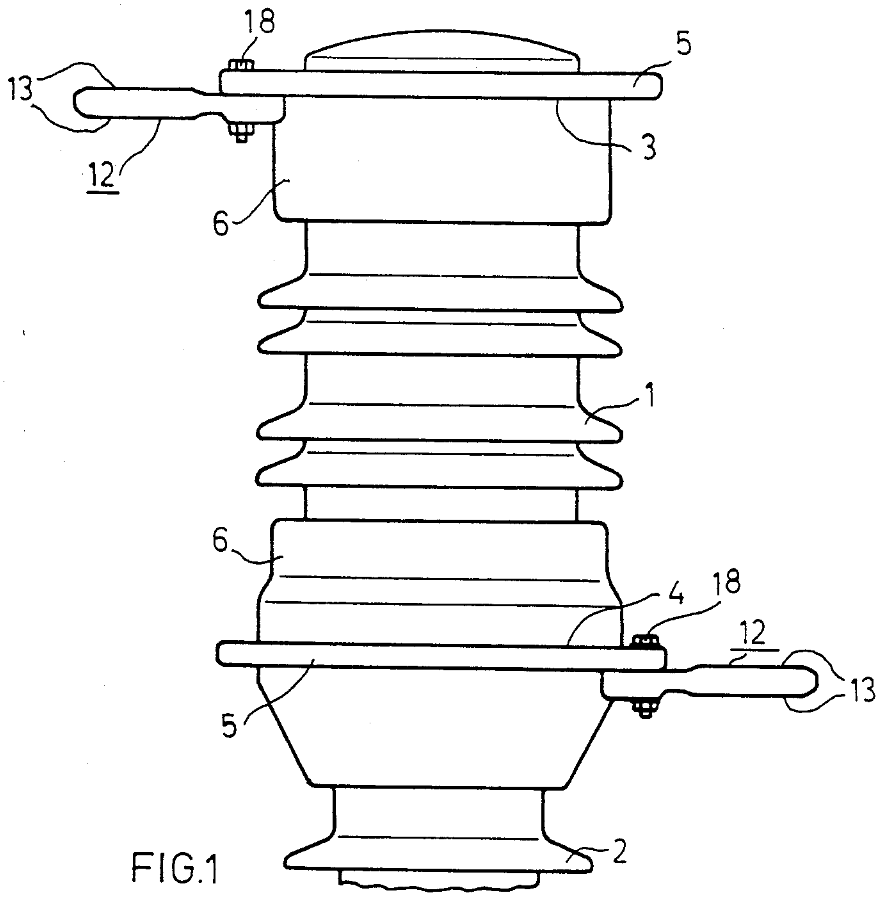
FIG. 1 shows a view of an interrupter unit of a high-voltage circuit breaker.
Figure 2:
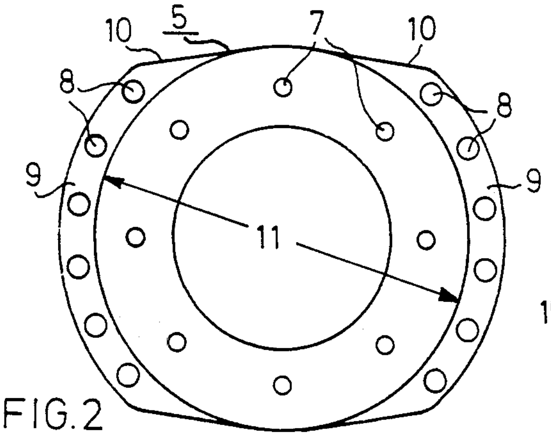
FIG. 2 is a side view of a terminal plate.
Figure 3:
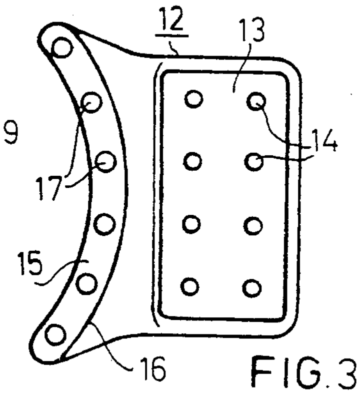
FIG. 3 is a side view of a part having a contact face.

In a high-voltage compressed-gas circuit breaker filled with $SF_6$, the interrupter unit 1 is disposed on a support column 2. The interrupter unit 1 is closed gas tight at each of its end faces 3, 4 by a terminal plate 5. For this purpose, the terminal plate 5 is connected with the attachment flange 6 through bores 7 in a suitable manner, not shown.

The terminal plate 5 also contains bores 8 arranged on a circular circumference in a uniform distribution. The bores 8 are located in peripheral regions 9 which form arc-of circle segments. These peripheral regions 9 are provided on two opposite sides of the terminal plate 5, so that they protrude over the outside diameter 11 of the interrupter unit 1. The lateral edges 10 of the peripheral regions 9 are rounded and brought close to this outside diameter 11, so that in the region of the terminal plate 5 perpendicular to the peripheral regions 9 the outside diameter 11 determines the dimensions of the terminal plate 5. Therefore, the disruptive distance between two adjacent poles of the circuit breaker is not increased as a result of the additional attachment means that become necessary by the separate construction of a contact part having a contact face.

The separate contact part 12 has a contact face 13 with attachment bores 14 for cables (not shown) to be connected to the face 13. A flange portion 15 on the face 13 forms an arc-of-circle segment 16. This flange portion 15 on separate contact part 12 corresponds to the peripheral region 9 on the terminal plate 5. The bores 17 are disposed on the flange portion 15 in the same manner as the bores 8 in region 9 so that the bores 17 lie in a corresponding uniform distribution on the same circular circumference as the bores 8.

The separate contact part 12 with the contact face 13 is connected with one of the two peripheral regions 9 of terminal plate 5 by bolts 18. Contact part 12, therefore, is reversible by 180°. In the exemplary illustrated embodiment, contact part 12 is on the right side at the lower end face 4 and on the left side at the upper end face 3 of interrupter unit 1.

Contact part 12 with the contact face 13 can at any time be connected to the hermetically closed interrupter unit 1 of the high-tension circuit breaker or be removed again without affecting the readiness of the gas-filled circuit breaker for operation, since the interrupter unit 1 does not need to be opened for that purpose. This permits easy adaptation of the contact face 13 to altered installation conditions. These conditions can be a change in the position of the face 13, allowing it to be reversed by 180°, or a change with respect to the arrangement and dimensions of the attachment bores 14 in contact face 13 for receiving the attachment means with which the connection to the incoming and outgoing overheard cables, not shown, is carried out. If the requirements regarding the arrangement and dimensions of the attachment bores 14 on contact face 13 are changed, due to different standards for example, exchange of the separate contact parts 12 can therefore be done in a very simple manner.

What is claimed is:

1. A high-voltage compressed-gas circuit breaker comprising:

at least one interrupter unit with end faces;

terminal plates, for closing off the interrupter unit at the end faces;

contact parts separable from the terminal plates, said contact parts including contact faces for receiving cables;

bores in said contact parts and in said terminal plates for receiving means for connecting said contact parts with said terminal plates;

said bores in said contact plates lying in a peripheral region which protrudes beyond an outside diameter of said interrupter unit; and wherein said bores are respectively distributed in said contact parts and said terminal plates such that said contact parts are reversibly attachable at the terminal plates.

2. A high-voltage circuit breaker according to claim 1, wherein said contact parts are attachable to said terminal plates in either a first position or a second position which is rotated 180° from said first position.

3. A high-voltage circuit breaker according to claim 2, wherein the contact parts include a flange portion which forms an arc-of-circle segment and in which said bores are arranged.

4. A high-voltage circuit breaker according to claim 2, wherein said bores in said flange portion and said bores in said peripheral region are uniformly distributed on a same circular circumference.

5. A high-voltage circuit breaker according to claim 1, wherein the contact parts include a flange portion which forms an arc-of-circle segment and in which said bores are arranged.

* * * * *